H. SPAULDING.
Threshing Machine Knives.
No. 85,865.
Patented Jan. 12, 1869.
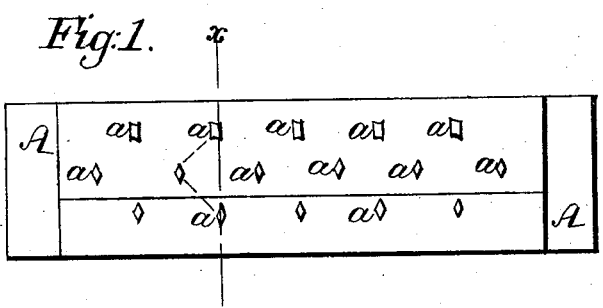
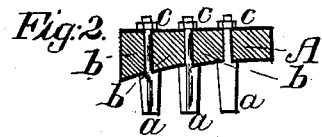

HENRY SPAULDING, OF FLETCHER, VERMONT.

Letters Patent No. 85,865, dated January 12, 1869.

IMPROVEMENT IN THRESHING-KNIVES.

The Schedule referred to in these Letters Patent and making part of the same.

*To all whom it may concern:*

Be it known that I, HENRY SPAULDING, of Fletcher, in the county of Franklin, and State of Vermont, have invented new and useful Improvements in Threshing-Knives; and I do hereby declare that the following is a full, clear, and exact description thereof, which will enable others skilled in the art to make and use the same, reference being had to the accompanying drawings, forming part of this specification.

Figure 1 is a top view of a portion of the concave of a threshing-machine, showing my improved knives affixed thereto.

Figure 2 is a section of the same, through the line $x$–$x$ of fig. 1.

Similar letters of reference indicate corresponding parts.

The nature of this invention relates to the form of the threshing-knives usually affixed in the concave of threshing-machines.

It consists in forming the said knives with two cutting-edges, and affixing the same to the concave in such a manner that the knives may be reversed, to present a new edge when the other has become dulled from use, thereby enabling the machine to be run twice as long as when knives with only one edge are employed.

In the accompanying plate of drawings, these double-edged knives are shown at $a\ a\ a\ a$, &c., each having a circular shank, $b$, which latter is provided with a nut, $c$, for holding the knife firmly in the concave, A. When the edges of the knives have become dulled, the nuts $c\ c\ c$, &c., are loosened, and the knives reversed, to present a new and sharp edge to the straw.

The front row of knives is formed with a guttered or grooved edge, which conduces to the more perfect operation, as has been satisfactorily proven by practical trial.

I am aware that diamond-shaped teeth have already been used in the concaves of threshing-machines, but, as in themselves considered, they form no part of my invention, I do not claim them.

I claim as new, and desire to secure by Letters Patent—

In combination with the threshing-machine concave, having reversible diamond-shaped teeth, the reversible guttered teeth $a$, arranged with relation to the diamond-shaped teeth, as herein shown and described.

The above specification of my invention signed by me, this 27th day of March, 1868.

HENRY SPAULDING.

Witnesses:
A. B. BLAIR,
E. O. SAFFORD.